(12) United States Patent
Arlt et al.

(10) Patent No.: US 6,794,421 B2
(45) Date of Patent: Sep. 21, 2004

(54) POLYISOCYANATE POLYADDITION PRODUCTS

(75) Inventors: Andreas Arlt, Weisenheim am Berg (DE); Sarbananda Chakrabarti, Mannheim (DE); Martin Kreyenschmidt, Lohne (DE); Dieter Rodewald, Bad-Essen (DE)

(73) Assignee: BASF Aktiengesellschaft, Ludwigshafen (DE)

(*) Notice: Subject to any disclaimer, the term of this patent is extended or adjusted under 35 U.S.C. 154(b) by 0 days.

(21) Appl. No.: 10/273,010

(22) Filed: Oct. 17, 2002

(65) Prior Publication Data

US 2003/0130366 A1 Jul. 10, 2003

Related U.S. Application Data

(62) Division of application No. 09/744,509, filed on Jan. 24, 2001, now Pat. No. 6,495,611.

(30) Foreign Application Priority Data

Jun. 23, 1999 (DE) .......................................... 199 28 676

(51) Int. Cl.$^7$ .............................................. C08G 18/62
(52) U.S. Cl. ....................................... 521/124; 521/130
(58) Field of Search ................................. 521/130, 124

(56) References Cited

U.S. PATENT DOCUMENTS

| | | | |
|---|---|---|---|
| 3,373,122 A | * | 3/1968 | Porter et al. |
| 3,401,144 A | | 9/1968 | Britain et al. |
| 4,211,847 A | | 7/1980 | Kehr et al. |
| 4,237,237 A | | 12/1980 | Jarre et al. |
| 4,294,785 A | | 10/1981 | Patton |
| 4,303,755 A | * | 12/1981 | Yukuta et al. |
| 4,510,097 A | | 4/1985 | Kehr et al. |
| 5,350,781 A | | 9/1994 | Liman et al. |
| 5,549,841 A | | 8/1996 | Kinkelaar et al. |

FOREIGN PATENT DOCUMENTS

| | | |
|---|---|---|
| CA | 2144466 | 3/1995 |
| DE | A 23 31 796 | 6/1973 |
| DE | 29 46 625 C2 | 11/1979 |
| DE | A 34 43 341 A | 11/1984 |
| DE | 238 992 A1 | 7/1985 |
| DE | 298 246 A5 | 11/1988 |
| DE | 42 32 420 A1 | 9/1992 |
| EP | 0 000 933 A1 | 3/1979 |
| EP | 0 672 698 A1 | 9/1995 |
| FR | 1 550 562 | 12/1967 |
| GB | 1 014 974 | 12/1965 |
| GB | 1 565 124 | 4/1980 |
| GB | 2 196 974 A | 5/1988 |
| GB | 2 313 128 A | 11/1997 |
| JP | 57002321 | * 1/1982 |
| JP | 61055127 | * 3/1986 |
| WO | WO 99/00438 | 1/1999 |

* cited by examiner

Primary Examiner—Rachel Gorr
(74) Attorney, Agent, or Firm—Fernando A. Borrego

(57) ABSTRACT

The polyisocyanate polyaddition products comprise hydrophobic compounds plus at least one further compound selected from the group consisting of: (i) organic, cyclic compounds having a molecular weight of from 200 to 3000 g/mol, (ii) salts of metals of transition groups I, II and/or VIII, (iii) organic and/or inorganic acid anhydrides, (iv) cyclic sulfonic esters and/or sulfones, (v) lactones, lactams and/or cyclic esters and/or (vi) α,β-unsaturated carboxylic acids, α,β-unsaturated carboxylic acid derivatives, α,β-unsaturated ketones and/or α,β-unsaturated aldehydes.

13 Claims, No Drawings

POLYISOCYANATE POLYADDITION PRODUCTS

This application is a divisional of Ser. No. 09/744,509, filed Jan. 24, 2001 now U.S. Pat. No. 6,495,611.

The present invention relates to polyisocyanate polyaddition products comprising hydrophobic compounds plus at least one further compound selected from the group consisting of: (i) organic, cyclic compounds having a molecular weight of from 200 to 3000 g/mol, (ii) salts of metals of transition groups I, II and/or VIII, (iii) organic and/or inorganic acid anhydrides, (iv) cyclic sulfonic esters and/or sulfones, (v) lactones, lactams and/or cyclic esters and/or (vi) $\alpha,\beta$-unsaturated carboxylic acids, $\alpha,\beta$-unsaturated carboxylic acid derivatives, $\alpha,\beta$-unsaturated ketones and/or ($\alpha,\beta$-unsaturated aldehydes, preferably selected from the group consisting of: (i), (iii), (iv), (v) and/or (vi), particularly preferably selected from the group consisting of (iii), (iv) and/or (vi). Furthermore, the invention relates to a process for producing these polyisocyanate polyaddition products, in particular mattresses or furniture upholstery and/or carpet backing. The invention also relates to the use of hydrophobic compounds for reducing the formation and/or the content of primary amines in polyisocyanate polyaddition products and/or for reducing the water uptake of polyisocyanate polyaddition products, in particular flexible polyurethane foams.

The production of polyisocyanate polyaddition products by reacting polyisocyanates with compounds which are reactive toward isocyanates in the presence of catalysts which accelerate the reaction of the substances which are reactive toward isocyanates with isocyanates and, if desired, blowing agents, additives and/or auxiliaries is generally known.

Like other plastics, polyisocyanate polyaddition products are subject to aging processes which generally lead to a deterioration in the use properties as time goes on. Important aging influences are, for example, hydrolysis, photooxidation and thermal oxidation which lead to rupture of bonds in the polymer chains. In the case of polyisocyanate polyaddition products, for example polyurethanes, hereinafter also referred to as PURs, especially the action of moisture and even more the combination of moisture and elevated temperature results in hydrolytic cleavage of the urethane and urea bonds.

This cleavage is not only reflected in a significant deterioration in the use properties but also leads to formation of primary aromatic amines, e.g. toluenediamine (TDA) and diaminodiphenylmethane (MDA), or primary aliphatic amines such as hexamethylenediamine or isophoronediamine.

As experiments have found, amine formation is influenced by a series of parameters. In particular, high temperatures above 80° C. in combination with high atmospheric humidity lead to hydrolytic cleavage of the urethane and urea bonds. Such conditions are of importance in some specific applications of flexible PUR foams.

A further parameter which has a significant influence on the formation of primary amines is the type and amount of catalysts used. As has been able to be shown in various experiments, the catalysts which are present in polyurethane systems and are necessary for the urethanization and blowing reaction also catalyze the hydrolytic redissociation reaction to a considerable extent. The presence of catalysts is thus a critical precondition for the hydrolysis of the urethane and urea bonds. Furthermore, it has been able to be shown that the efficiency of the hydrolysis is highly dependent on the activity and the type of catalyst, and also on whether the catalyst remains in the system or can migrate out of the material. In particular, tertiary amine catalysts having reactive functional groups such as OH and $NH_2$ considerably accelerate amine formation by lowering the activation energy for the cleavage reaction. The functional groups result in incorporation of the catalysts into the PUR network formed and the products produced using them have the advantage of lower odor and fogging problems since the catalysts cannot escape by diffusion after production of the PUR product. The same applies to formulations comprising polyols which have been prepared using primary or secondary amines as initiator molecules and thus have catalytically active centers. Such polyols have been increasingly used in recent times. In the case of formulations which comprise such constituents and are exposed to particularly hot and humid conditions in specific applications, the formation of primary amines as dissociation products cannot be ruled out. In contrast, in the case of foams produced using amine catalysts which contain no functional groups capable of being built into the structure, the catalysts are generally given off only a short time after manufacture or during aging of the foam. In the case of such foams, hot and humid conditions lead to significantly lower amine contents.

As compounds which reduce the aromatic amine content of flexible polyurethane foams, U.S. Pat. No. 4,211,847, GB 1 565 124 and DE-A 29 46 625 make use of sterically hindered cycloaliphatic monoisocyanates and monothioisocyanates. Owing to their steric hindrance and their lower reactivity compared to aromatic isocyanates, these isocyanates react to only a slight extent during the foaming reaction, so that free isocyanate is available for reaction with any aromatic amines present after the foaming reaction is complete. Disadvantages of these known teachings are that the compounds mentioned are relatively expensive and, especially the two last-named compounds, also participate at least partially in the urethanization reaction despite their steric hindrance and do not react only after the foaming reaction with aromatic amine formed. In addition, these isocyanates tend to migrate out of the finished foam because of their low vapor pressure and thus pose a further health hazard due to the occurrence of free isocyanate.

DE-A 42 32 420 discloses the use of $\alpha,\beta$-unsaturated ester carboxylates for producing polyurethane foams which have an improved compressive strength and elongation at break. In that document, salts of $\alpha,\beta$-unsaturated ester carboxylates are used as catalysts for the NCO/water reaction. In an aside, it is stated that the compounds are, due to the presence of olefinic double bonds adjacent to the carboxylate groups, capable of addition of amino groups which are formed during the slow aging of the foam. A disadvantage of these compounds is their catalytic action which has an adverse effect on the foaming reaction. A catalytic action of additives for reducing the amine contents of finished PUR foams is, however, not desirable since this leads, as described above, to further and accelerated formation of primary amines.

Hydrolysis inhibitors for polyurethanes containing ester groups are described in DE-A 23 31 796, FR 1 550 562 and GB 1 014 974. The increase in the hydrolysis resistance of the PUR products is usually based on an improvement in the mechanical properties after storage under hot and humid conditions. DE-A 23 31 796 describes the addition of epoxy compounds in order to avoid hydrolysis of the ester groups in PUR products. For the same purpose, FR 1 550 562 claims alkyl carbonates and GB 1 014 974 claims carbodiimides in combination with a compound containing enol groups.

DD 238 992 describes epoxidized synthetic products such as triglycerides, alkyl epoxystearates, etc., and epoxidized natural products such as soya oil as hydrolysis inhibitors for polyurethane elastomers. However, the improvement in the hydrolysis resistance (increased hardness, tensile strength and elongation at break) is restricted to polyurethane elastomers containing polyesters as polyol component. DD 298 246 claims a polyol component for producing noncellular polyurethane moldings having an improved hydrolysis resistance. The improvement in the hydrolysis resistance is achieved here by addition of fatty amines.

A similar reaction mixture is claimed in DE-A 3 443 341. The improvement in the elongation at break of possibly cellular polyurethanes is achieved here by means of a mixture of an inorganic filler, a metal salt of a fatty acid and a hydrophobicizing agent such as a fatty acid amide, fatty alcohol or a natural or synthetic wax.

GB 2 313 128 discloses castor oil and derivatives and also polyols based on polybutadiene and saturated hydrocarbons (>$C_{10}$) for increasing the resistance of polyurethanes to discoloration. It is also possible to use hydrophobic compounds without OH groups, for example olefins, paraffins and also animal and vegetable oils.

U.S. Pat. No. 5,549,841 claims a process for producing flexible PUR foams having an improved compressive set for use in a tropical or subtropical climate. This improvement is achieved by the use of polyols having a variable ethylene oxide content or a variable ethylene oxide end cap in combination with polymer polyols. The polymer polyol comprises a vinyl polymer dispersion in a polyoxyalkylene base polyol.

EP-A 672 698 describes a process for producing polyurethanes by addition of reaction products of polyalkylenepolyamines and natural fats or oils. The foams produced using these products are largely closed-celled and therefore have a rigid foam character. Such formulations are unsuitable for flexible foam applications.

A further document in which hydrophobic PUR foams are described is EP-A 933. The foams produced with addition of fatty acids, fatty acid esters, adducts of fatty acids and EO/PO and also fatty acid amides have a high absorption capability in respect of oil and possibly halogen-containing, hydrophobic compounds.

WO 99/00428 discloses flexible polyurethane foams which are produced using hydroxylated polydienes.

It is an object of the present invention to modify polyisocyanate polyaddition products, in particular polyurethane foams, in such a way that the hydrolytic cleavage of urethane and urea bonds and thus, in particular, the formation of aromatic amines is prevented or at least reduced. The compounds should be inexpensive and readily available and should be able to display their effect in the finished foam without further after-treatment. In addition, they should affect the foam properties as little as possible.

We have found that this object is achieved by the polyisocyanate polyaddition products described at the outset and the use of the hydrophobic compounds likewise described at the outset.

It has been found that the extent of hydrolytic redissociation of urethane and urea bonds is dependent to a considerable degree on the penetration of moisture into the foam matrix. It was thus necessary to find additives which hinder the penetration of moisture, especially in foams which are exposed to hot and humid conditions. These additives should have no significant effect on the foaming reaction and the properties of the foams.

The penetration of moisture into the foam matrix was able to be influenced by the degree of hydrophilicity or hydrophobicity of the foams. It was found that, because of its water-repellent properties, a hydrophobic foam takes up less moisture than a hydrophilic foam. The problem described could accordingly be solved by increasing the hydrophobicity of the foams. Surprisingly, it was found that these technical teachings according to the present invention not only enable the penetration of water into, in particular, the flexible polyurethane foam to be prevented but also enable the formation of primary amines to be reduced.

The hydrophobic compounds used according to the present invention are preferably employed in the generally known processes for producing polyisocyanate polyaddition products, preferably polyurethanes which may contain isocyanurate and/or urea structures, particularly preferably flexible polyurethane foams. The present invention therefore also provides a process for producing flexible polyurethane foams having the properties according to the present invention in respect of water uptake and/or water adsorption by producing the flexible polyurethane foam in the presence of the hydrophobic compounds used according to the present invention.

The hydrophobic compounds used according to the present invention preferably contain groups which are reactive toward isocyanates, more preferably from 2 to 4 reactive groups, in particular hydroxyl groups.

Preferred hydrophobic compounds have a molecular weight of from 500 to 8000 g/mol and have at least one continuous carbon framework, i.e. a carbon framework connected by means of carbon-carbon bonds, having at least 8, preferably at least 10, carbon atoms.

The hydrophobic compounds used are therefore preferably reaction products of castor oil with alkylene oxides, epoxidized fatty acid esters, low molecular weight hydroxyfunctional polyolefins preferably having a molecular weight from 500 to 8000 g/mol and/or oleochemical polyols based on a $C_9$–$C_{22}$-fatty acid and prepared by ring opening of epoxidized triglycerides.

In particular, it is possible to use modified, where the term modified refers, for example, to ring-opened fatty acid esters, or unmodified fatty acid esters, oils, in particular vegetable oils, and/or polyolefins, for example:

oleochemical polyols, e.g. triglycerides, based on a $C_9$–$C_{22}$-fatty acid and prepared, for example, by ring opening of epoxidized fatty acid esters, for example triglycerides, and preferably having a hydroxyl number (OHN) of from 50 to 300 mg KOH/g, where the epoxy content can be varied from 0% to 10% depending on the completeness of ring opening;

fatty acid esters, preferably epoxidized fatty acid esters, preferably having a hydroxyl number (OHN) of from 30 to 500 mg KOH/g, particularly preferably from 100 to 200 mg KOH/g, preferably based on a $C_9$–$C_{22}$-fatty acid, e.g. prepared by transesterification of oleochemical polyols with $C_1$–$C_{30}$-alkanols, e.g. alkyl epoxystearates, alkyl epoxytallates, alkyl epoxytetrahydrophthalates, alkyl oleates, dialkyl adipates, dialkyl sebacates, di(methylcyclohexyl) phthalate, dicyclohexyl phthalate, diisotridecyl phthalate, hexyl oleylcetyl phthalate, di(oleylcetyl) phthalate, dioctyl adipate, diisodecyl adipate, dibutyl sebacate, dioctyl sebacate, isobutyl stearate, the 2-ethylhexyl ester of epoxidized soya oil, isobutyl esters of fatty acids, the isobutyl ester of tallow acid, 2-ethylhexyl stearate and/or tetrahydrofurfuryl oleate;

reaction products of natural vegetable oils, e.g. castor oil, linseed oil and/or soya oil, with ethylene oxide and/or propylene oxide, preferably propylene oxide, advantageously having an OHN of from 50 to 200, particularly preferably from 80 to 90, mg KOH/g and/or low molecular weight polyolefins, preferably having a molecular weight of from 500 to 8000 g/mol, which are preferably hydroxy-functionalized at both ends and/or have an epoxidized isoprene unit at one or both ends.

Replacement of part of the polyol component, for example in the production of flexible polyurethane foams, by the hydrophobic compounds described enables the hydrophobicity of the foams to be increased so that the penetration of moisture is significantly inhibited. This is a tremendous advantage for, in particular, foams which are exposed to hot and humid conditions (hot steam disinfection or in future sterilization of hospital mattresses, hot steam cleaning of upholstered furniture and carpets). In the case of foams which have been produced using such polyols, the entry of moisture is inhibited to such a degree that the occurrence of hydrolytic cleavage of urethane and urea bonds under hot and humid conditions is significantly reduced.

The formation of primary aromatic amines such as toluenediamine or diaminodiphenylmethane associated with this cleavage reaction is likewise significantly reduced by this measure. The stabilizing action of the polyols used according to the present invention is advantageously based on a prevention of the formation of primary amines, while the addition of other additives, e.g. the abovementioned sterically hindered isocyanates, results in only primary amine which has already been formed being chemically bound. The hydrophobic compounds used according to the present invention do not pose a health hazard and can be easily incorporated into the polyol component because of their good compatibility with the constituents of the polyol component. The hydrophobic compounds used according to the present invention counter both a deterioration in the mechanical properties, particularly when exposed to hot and humid conditions, and also the formation of primary amines, in particular primary aromatic amines, for example 2,2'-, 2,4'- and/or 4,4'-MDA and/or 2,4- and/or 2,6-TDA.

The use of oleochemical polyols, in particular, gives open-celled foams. Varying the proportion of these polyols allows the open cell content of PUR foams to be set in a targeted manner.

The use of the hydrophobic compounds described makes it possible to obtain foams which consist in large part of natural, i.e. regenerating, raw materials. Since the production of molded PUR foams and slabstock foams is increasingly looked at from an ecological perspective, finished products containing a relatively high proportion of recyclable components should be produced in future so as to conserve resources.

To produce the polyisocyanate polyaddition products, the hydrophobic compounds are preferably used in an amount of from 0.2 to up to 100.0% by weight, based on the weight of all the isocyanate-reactive compounds employed.

To produce the polyisocyanate polyaddition products, it is also advantageous to use (i) organic, cyclic compounds having a molecular weight of from 200 to 3000 g/mol, preferably from 200 to 1300 g/mol, hereinafter also referred to as "macrocycles".

As a result of the use of the macrocycles, the macrocycles form complexes with tertiary amines which have been used as catalysts in the production of the polyisocyanate polyaddition products, in particular in the finished polyisocyanate polyaddition product, and the tertiary amines in the complex with the macrocycles can no longer display their catalytic activity, i.e. they are blocked. Since the complexed amine catalysts in the finished polyisocyanate polyaddition products are no longer capable of catalyzing the abovementioned hydrolytic redissociation of urethane and urea bonds, the macrocycles counter both a deterioration in the mechanical properties, in particular on exposure to hot and humid conditions, and also the formation of primary amines, in particular primary aromatic amines, for example 2,2'-, 2,4'- and/or 4,4'-MDA and/or 2,4- and/or 2,6-TDA. Furthermore, the formation of complexes of the macrocycles used according to the present invention with primary amines, for example primary aromatic amines, can hinder migration or extraction of these amines from the polyisocyanate polyaddition product. Migration or extraction of the amine catalysts, too, from the product is hindered by such complexation. The resulting reduction in odor and fogging problems is reinforced, in particular, by the additives used according to the present invention being able to be at least partially incorporated into the polyurethane network due to the presence of OH groups. The inclusion of primary and/or tertiary amines by the macrocycles which have been fixed in this way leads to the amines being immobilized in the foam matrix.

Macrocycles, e.g. cyclodextrins, are capable of the inclusion of water molecules as well as amines, which further reduces the occurrence of hydrolytic cleavage reactions and thus additionally counters the formation of primary amines.

As macrocycles, it is possible to use generally known compounds, for example cyclodextrins, resorcinarenes, cyclophanes and/or cyclocalixarenes, each of which may be in modified form.

Such cyclodextrins, which may also have a branched structure, are mentioned in, for example, U.S. Pat. No. 5,063,251, column 2, lines 55 to 63, and DE-A1 96 14 441, page 2, lines 46 and 47. Suitable cyclocalixarenes are described in U.S. Pat. No. 4,642,362, column 2, line 34 to column 7, line 68.

Preference is given to using α-cyclodextrin, β-cyclodextrin, γ-cyclodextrin, reaction products of these cyclodextrins with alkylene oxides, 4-tert-butylcalix[4]arene, 4-tert-butylcalix-[6]arene, 4-tert-butylcalix[8]arene, 4-sulfocalix[4]arene, 4-sulfocalix[6]arene, 4-sulfocalix[8]arene, C-methylcalix[4]resorcinarene, C-undecylcalix[4]resorcinarene, tetra-N-pentylcalix[4]resorcinarene and/or [2.2]paracyclophane, particularly preferably β-cyclodextrin, 4-tert-butylcalix[6]arene, 4-sulfocalix[6]arene and/or [2.2]paracyclophane.

The macrocycles can be used in the A and/or B components or in the constituents of these components, preferably in the isocyanate component in order to avoid complexation of the amine catalysts which are customarily present in the A component before the polyurethane product has been produced. If the macrocycles are not soluble in either the A component or the B component, they are dispersed in powder form in one of the two components and subsequently processed in this form.

To produce the polyisocyanate polyaddition products, the macrocycles are preferably used in an amount of from 0.2 to 5% by weight, based on the weight of the compounds which are reactive toward isocyanates.

Furthermore, (ii) salts of metals of transition groups I, II and/or VIII, hereinafter also referred to generally as "metal salts", are also advantageously used for producing the polyisocyanate polyaddition products. For the purposes of the present invention, the terms "salts of metals" or "metal salts" also include the cations of the metals specified in complexed form.

As a result of the use of the metal salts, the metal ions form complexes with tertiary amines used as catalysts in the production of the polyisocyanate polyaddition products, and the tertiary amines in the complex with the metals can no longer display their catalytic activity, i.e. they are blocked. Since the complexed amine catalysts in the finished polyisocyanate polyaddition products are no longer capable of catalyzing the abovementioned hydrolytic redissociation of urethane and urea bonds, the metal salts counter both a deterioration in the mechanical properties, in particular on exposure to hot and humid conditions, and also the formation of primary amines, in articular primary aromatic amines, for example 2,2'-, 2,4'- and/or 4,4'-MDA and/or 2,4- and/or 2,6-TDA. Furthermore, the formation of complexes of the metal salts used according to the resent invention with primary amines, for example primary aromatic amines, can hinder migration or extraction of these amines from the polyisocyanate polyaddition product. Such complexation prevents migration or extraction of the amine catalysts, too, from the product, which is reflected in improved fogging behavior of the foams. In addition, the metal salts can act as oxidation catalysts and accelerate oxidative degradation of any aromatic amines formed.

As metal salts, it is possible to use generally known salts of metals, for example salts of inorganic and/or organic acids, e.g. mineral acids, of the transition groups indicated, for example salts of the following metals: Cu, Ni, Co, Fe, Zn, Ag, Pd and Rh, preferably Cu, Ni and/or Fe salts, where the metals can be in any stable oxidation state.

As anion in the metal salts, it is possible for generally customary anions to be present, for example, chloride, sulfate, nitrate and/or carboxylates having from 1 to 20 carbon atoms. Furthermore, it is possible to use salts of complexed cations of the same metals with known ligands, for example monoalkylamines, alkylenediamines, phenanthroline, acetylacetone, aromatic phosphines such as triphenylphosphine, aliphatic phosphines such as tributylphosphine, salicylaldehyde and/or 1,4-diazabutadiene derivatives; it is preferred that no tertiary amines are used as ligands. Examples of metal salts or salts of their complex cations are the following compounds: Cu(II) sulfate, Cu(II) chloride, Ni(II) sulfate, Co(II) chloride, Cu(II) naphthenate, Fe(II) chloride, Cu(I) chloride, Fe(III) chloride, Cu(II) acetate-ethylenediamine complex, Fe(II) phenanthroline complex (generally known as a redox indicator under the name ferroin), Cu(I)-nitratobistriphenylphosphine complex, [glyoxal bis (cyclohexylimine)]chlorocopper(I) complex.

The central atom and ligand of the metal-ligand complex are preferably chosen so that the central atom of the complex can form complexes with primary aromatic amines or tertiary aliphatic amines or catalyze their oxidation. The complex between MDA and/or TDA or the amine catalysts and the metal cation of the complex used is preferably more stable, i.e. the dissociation constant is greater, than the complex cation used.

Preference is given to using Cu(II) sulfate, Ni(II) sulfate, Cu(II) acetate, Fe(II) phenanthroline complex, Cu(II)-acetate-ethylenediamine complex, Cu(II) naphthenate and/or Cu(I)-nitratobistriphenylphosphine complex as metal salt.

To produce the polyisocyanate polyaddition products, the metal salts are preferably used in an amount of from 0.05 to 5% by weight, based on the weight of the sum of the metal salts and the compounds which are reactive toward isocyanates.

The metal salts can be used in the A and/or B components or in the constituents of these components, preferably in the isocyanate component.

Furthermore, it can be useful to use (iii) organic and/or inorganic acid anhydrides, particularly preferably at least one carboxylic anhydride, for producing the polyisocyanate polyaddition products. The acid anhydride(s) is/are preferably used in an amount of from 0.01 to 20% by weight, based on the weight of the isocyanates and the acid anhydrides.

When acid anhydrides are employed, the anhydrides in the polyisocyanate polyaddition products are hydrolyzed to the acids, particularly under hot and humid conditions. These acids resulting from the hydrolysis block the amine catalysts which may be present in the products, for example by protonation or reaction, and thus prevent acceleration of the redissociation of the urethane bonds. In addition, the acid anhydrides used according to the present invention bind any free amino groups formed by undesired cleavage of urethane bonds.

The acid anhydrides are thus used in polyisocyanate polyaddition products to stabilize the polyisocyanate polyaddition products, in particular polyurethanes, against cleavage of the urethane and urea bonds, for example by blocking amine catalysts by protonating the catalysts or by reaction with the catalysts. In addition, the acid anhydrides can be employed in polyisocyanate polyaddition products to react with amino groups in the polyisocyanate polyaddition products, for example to form amides.

In this way, the diffusion of amines out of the polyisocyanate polyaddition products and the redissociation of the urethane bond, for example by amine catalysts present in the polyisocyanate polyaddition products, can be reduced.

It was surprisingly found that acid anhydrides used in the production of polyisocyanate polyaddition products survive the production process almost unscathed and do not participate significantly in the reaction. This is particularly true when the acid anhydrides are used in admixture with isocyanates, since this component is usually free of water and hydrolysis of the anhydrides can thus be avoided. Use of the acid anhydrides in admixture with compounds which are reactive toward isocyanates can be particularly advantageously carried out by adding the acid anhydrides to this mixture only just before production of the polyisocyanate polyaddition products, since the compounds which are reactive toward isocyanates usually contain small amounts of water. The acid anhydrides used according to the present invention can also be stable in the isocyanate-reactive compounds over a prolonged period of time.

Surprisingly, it has been found that the acid anhydrides are stable in admixture with isocyanates at room temperature, i.e. 25° C., and the isocyanate groups do not react or do not react significantly with the anhydride groups.

As anhydrides, it is possible to use organic or inorganic acid anhydrides, for example also polyanhydrides, preferably carboxylic anhydrides, for example anhydrides of aliphatic, cycloaliphatic, araliphatic and/or aromatic carboxylic acids having usually from 1 to 10, preferably 1 or 2, carboxyl groups, with mixed anhydrides prepared from at least two different carboxylic acids also being able to be used. Polyanhydrides obtainable from dicarboxylic and/or polycarboxylic acids or copolymers of anhydrides and various alkenes can also be used as anhydrides. The carboxyl groups of the compounds are preferably converted to a large extent, particularly preferably completely, into the corresponding anhydrides. The compounds (ii) usually have a molecular weight of from 60 to 1000000 g/mol. Examples which may be mentioned are: acetic anhydride, propionic anhydride, butyric anhydride, pentanoic anhydride, hexanoic anhydride, heptanoic anhydride, octanoic anhydride, dimethylolpropionic anhydride, adipic anhydride, fumaric anhydride, mesaconic anhydride, methylenemalonic anhydride, trimellitic anhydride, ethylene glycol 4,4'-bis (anhydrotrimellitate), 2-acetyl-1,3-glyceryl 4,4'-bisanhydrotrimellitate, decanedioic anhydride, dodecanedioic anhydride, azelaic anhydride, pimelic anhydride, brassylic anhydride, citraconic anhydride, itaconic anhydride, naphthalene-1,8-dicarboxylic anhydride, naphthalene-1,2-dicarboxylic anhydride, chlorendic anhydride, 1,2,3,6-tetrahydrophthalic anhydride, mellophanic anhydride, benzene-1,2,3,4-tetracarboxylic anhydride, benzene-1,2,3-tricarboxylic anhydride, benzoic anhydride, biphenyl-3,3'-4,4'-tetracarboxylic anhydride, biphenyl-2,2'-3,3'-tetracarboxylic anhydride, naphthalene-2,3,6,7-tetracarboxylic anhydride, naphthalene-1,2,4,5-tetracarboxylic anhydride, naphthalene-1,4,5,8-tetracarboxylic anhydride, decahydronaphthalene-1,4,5,8-tetracarboxylic anhydride, 4,8-dimethyl-1,2,3,5,6,7-hexahydronaphthalene-1,2,5,6-tetracarboxylic anhydride, 2,6-dichloronaphthalene-1,4,5,8-tetracarboxylic anhydride, 2,7-dichloronaphthalene-1,4,5,8-tetracarboxylic anhydride, 2,3,6,7-tetrachloronaphthalene-1,4,5,8-tetracarboxylic anhydride, phenanthrene-1,3,9,10-tetracarboxylic anhydride, perylene-3,4,9,10-tetracarboxylic anhydride, bis(2,3-dicarboxyphenyl)methane anhydride, bis(3,4-dicarboxyphenyl)methane anhydride, 1,1-bis(2,3-dicarboxyphenyl)ethane anhydride, 1,1-bis(3,4-dicarboxyphenyl)ethane anhydride, 2,2-bis(2,3-dicarboxyphenyl)propane anhydride, 2,2-bis(3,4-dicarboxyphenyl)propane anhydride, bis(3,4-dicarboxyphenyl) sulfone anhydride, bis(3,4-dicarboxyphenyl) ether anhydride, ethylenetetracarboxylic anhydride, butane-1,2,3,4-tetracarboxylic anhydride, cyclopentane-1,2,3,4-tetracarboxylic anhydride, pyrrolidine-2,3,4,5-tetracarboxylic anhydride, pyrazine-2,3,5,6-tetracarboxylic anhydride, mellitic anhydride, thiophene-2,3,4,5-tetracarboxylic anhydride, benzophenone-3,3',4,4'-tetracarboxylic anhydride, maleic anhydride, glutaric anhydride, pyromellitic anhydride, phthalic anhydride, isophthalic and/or terephthalic anhydride, benzoic anhydride, phenylacetic anhydride, cyclohexylalkane anhydrides, malonic anhydride, succinic anhydride, polymaleic anhydride, anhydrides based on adducts of maleic acid and styrene, dodecenylsuccinic anhydride, anhydrides of maleic acid and any alkylenes, for example n-octylenesuccinic anhydride, n-dodecylenesuccinic anhydride and/or copolymers of anhydrides and any further monomers such as isobutene and maleic anhydride, poly(ethylene-co-butyl acrylate-co-maleic dianhydride) and/or poly(styrene-co-maleic anhydride), where the diacids or polyacids are partially or preferably completely in the form of anhydrides. The anhydrides of the diacids or polyacids can, insofar as it is sterically possible, be either intermolecular or intramolecular.

Preference is given to using anhydrides based on the following compounds: pyromellitic acid, succinic acid, maleic acid, polymaleic anhydride, glutaric acid, which may also contain a variety of side groups, and/or copolymers of these anhydrides with all conceivable monomers which are polymerizable with anhydrides or acids.

Very particular preference is generally given to anhydrides which dissolve readily in the isocyanates and/or the compounds which are reactive toward isocyanates, preferably the isocyanates.

Furthermore, it is possible to use (iv) cyclic sulfonic esters, also known as sultones, and/or sulfones, i.e. compounds containing sulfonyl groups, preferably unsaturated sulfones. The cyclic sulfonic esters and sulfones are hereinafter also referred to collectively as "sulfur compounds". It has surprisingly been found that the addition of the sulfur compounds leads to significantly reduced primary amine contents. The reaction of primary amines can occur under relatively mild conditions. Apart from the reaction of primary amine already formed to give less problematical compounds, the addition of sulfur compounds, in particular sultones, prevents the formation of the primary amines. The mechanism leading to this reduced amine formation is based on the deactivation of the tertiary amine catalysts present, which, after the polyurethane product has been produced, contribute to catalysis of the hydrolytic cleavage of urethane and urea bonds and thus to the formation of primary amines.

The added sultones, in particular, are hydrolyzed during the foaming reaction as a result of the heat generated to form the corresponding sulfonic acids. These sulfonic acids are in turn capable of reacting with tertiary amines by protonating the catalytically active nitrogen atom. This counters not only the formation of primary amines but also the associated deterioration in the mechanical properties during aging of the polyurethane product. As a particular advantage of the additives used according to the present invention, it has surprisingly been found that there is even an improvement in the mechanical properties before aging. A further positive effect associated with this hydrolysis of the sultones is that a major part of the water which penetrates is consumed in this reaction and is no longer available for the cleavage of urethane and urea bonds. In order to prevent premature hydrolysis of the sultones prior to the foaming reaction, they are preferably dissolved in the isocyanate component.

In unsaturated sulfones, the sulfonyl group causes, as a result of the partial positive charge on the sulfur atom, such a strong polarization of the C=C double bond that this is capable of adding primary amines under very mild conditions. The primary amine content of polyisocyanate polyaddition products can be significantly reduced by the addition of unsaturated sulfones as a result of reaction to form unproblematical compounds. In addition, sulfones also lead to an improvement in the mechanical properties of the polyisocyanate polyaddition products.

The addition of sultones and sulfones can reduce the diffusion or migration of primary amines out of the polyurethane products. In hydrolyzed form, sultones improve the fogging behavior by preventing diffusion of tertiary amine catalysts as a result of the reaction of these with the hydrolyzed sultones.

In the case of brominated sultones (e.g. tetrabromo-2-sulfobenzoic anhydride) and sulfones, an increase in the flame resistance of the foams produced therewith has also been found.

Accordingly, the sulfur compounds counter both a deterioration in the mechanical properties, particularly on exposure to hot and humid conditions, and also the formation of primary amines, in particular primary aromatic amines, for example 2,2'-, 2,4'- and/or 4,4'-MDA and/or 2,4- and/or 2,6-TDA.

The additives used according to the present invention have been found to be particularly effective in PUR formulations which contain tertiary amines having reactive functional groups as catalysts.

As sulfur compounds, it is possible to use generally known compounds, preferably sultones and/or unsaturated sulfones.

Examples are: cyclic esters of aliphatic and aromatic sulfonic acids, known as sultones, e.g. 1,3-propanesultone, 1,4-butanesultone, 2,4-butanesultone, 2,3-benzopropanesultone, tolylsultone, 2-sulfobenzoic cycloanhydride, tetrabromo-2-sulfobenzoic cycloanhydride, tetraiodo-2-sulfobenzoic cycloanhydride, 1-naphthol-8-sulfonic sultone, carbyl sulfate and/or triphenylmethane dyes containing sultone groups, e.g. phenol red, pyrogallol red, pyrocatechol violet, thymol blue, bromothymol blue, p-xylenol blue, bromoxylenol blue, bromocresol green, bromophenol blue, tetrabromophenol blue, chlorophenol red, cresol red, xylenol orange, bromophenol red, nitrophenolsulfonephthalein, sulfonefluorescein and/or bromopyrogallol red, preferably 1,3-propanesultone, 1,4-butanesultone, 2,4-butanesultone, 2-sulfobenzoic cycloanhydride, tetrabromo-2-sulfobenzoic cycloanhydride and 1-naphthol-8-sulfonic sultone.

Unsaturated sulfones which can be used are, for example, butadiene sulfone, divinyl sulfone, benzyl allyl sulfone, allyl sulfone, thionaphthene 1,1-dioxide and/or p-tolyl vinyl sulfone, preferably butadiene sulfone.

To produce the polyisocyanate polyaddition products, the sulfur compounds are preferably used in an amount of from 0.01 to 20% by weight, based on the weight of the polyisocyanate polyaddition product.

Furthermore, it is possible to use (v) lactones, lactams and/or cyclic esters, hereinafter also referred to as "inhibitors".

The addition of the inhibitors in PUR foam formulations surprisingly leads to significantly reduced contents of primary amines. As inhibitors to be used according to the present invention for reducing the primary amine content in polyurethane products, we have accordingly found lactones or cyclic esters and lactams. As experiments have shown, there are various mechanisms which contribute to this reduction. The hydrolysis of lactones in the presence of moisture to form hydroxycarboxylic acids is known from the literature. The carboxylic acid formed by hydrolysis of the inhibitor is capable of protonating the tertiary N atom in the amine catalyst. As a result of the catalytically active N atom being blocked with formation of a quaternary N atom, the amine catalyst loses its catalytic activity in respect of the hydrolytic redissociation of urethane and urea bonds. This counters a deterioration in the mechanical properties of the polyisocyanate polyaddition products, in particular the flexible foams, especially when exposed to hot and humid conditions, and also the formation of primary amines, in particular primary aromatic amines, for example 2,2'-, 2,4'- and/or 4,4'-MDA and/or 2,4- and/or 2,6-TDA. The addition of the inhibitors reduces the hydrolysis of urethane and urea bonds in two ways: as mentioned by deactivating the amine catalysts present and also as a result of a major part of the water which penetrates being consumed in the hydrolysis of the lactones and lactams added and no longer being available for the cleavage of urethane and urea bonds. Moreover, the inhibitors are also capable of reacting with primary amine which has already been formed to give hydroxycarboxamides or aminocarboxamides.

The addition of the inhibitors can reduce the diffusion or migration of primary amines out of the polyurethane products by converting the primary amines into hydroxycarboxamides or aminocarboxamides. The relatively high molecular weight of the reaction products, in particular when using lactones of higher carboxylic acids, e.g. of hydroxydecanoic acid or of hydroxydodecanoic acid, reduces diffusion or migration out of the polyurethane matrix so that the fogging behavior is improved.

After they have been hydrolyzed, lactams and lactones also effect an improvement in the fogging behavior of polyurethane products by preventing diffusion of the tertiary amine catalysts used by protonating them. Furthermore, in some applications it is desirable to increase the crosslinking density of polyurethane foams, in particular flexible polyurethane foams, by modification of the formulation (increasing the proportion of crosslinker, use of multiring MDI, increasing the index) without, however, increasing the hardness too much at the same time. The addition of lactones and lactams, which also function as plasticizers, makes it possible to compensate for this undesired increase in hardness.

Examples of inhibitors which can be used according to the present invention are the following compounds:

Lactones, for example those having a molecular weight of from 70 to 300 g/mol, e.g. β-propiolactone, γ-butyrolactone, γ-valerolactone, ε-caprolactone, γ-decanolactone, δ-decanolactone, δ-dodecanolactone, γγ-dimethylbutyrolactone and/or α-ethyl-γ-methylbutyrolactone.

Lactams, for example those having a molecular weight of from 70 to 300 g/mol, e.g. β-propiolactam, 2-pyrrolidone, N-methylpyrrolidone and 2-piperidone.

Cyclic esters, for example those having a molecular weight of from 150 to 500 g/mol, preferably condensation products of aliphatic, cycloaliphatic, araliphatic and/or aromatic dicarboxylic acids having from 4 to 15 carbon atoms and aliphatic, cycloaliphatic, araliphatic and/or aromatic dialcohols having from 2 to 15 carbon atoms, particularly preferably condensation products based on diethylene glycol (DEG) and adipic acid (ADA). These cyclic esters, for example the cyclic DEG-ADA ester and the cyclic ADA-DEG-ADA-DEG ester, are found, along with DEG and low molecular weight linear esters, in an amount of about 40–50% by mass in a distillation residue obtained in the synthesis of polyester polyols based on ADA-DEG-trimethylolpropane and are accordingly particularly economically advantageous to use.

To produce the polyisocyanate polyaddition products, the inhibitors are preferably used in an amount of from 0.01 to 20.0% by weight, based on the weight of the compounds which are reactive toward isocyanates.

Furthermore, generally known α,β-unsaturated carboxylic acids, α,β-unsaturated carboxylic acid derivatives, α,β-unsaturated ketones and/or α,β-unsaturated aldehydes as (vi) can advantageously be used.

As a result of the use of (vi), any free amino groups formed by undesired cleavage of urethane and/or urea groups are bound by reaction with the compounds (vi) used according to the present invention.

Both primary and secondary amines are capable of addition to C=C double bonds, particularly if these are adjacent to a carbonyl group. This Michael addition of the amine occurs onto the unsaturated system in which the π-electrons are delocalized over the carbonyl group. As has been found in experiments, temperatures of from 70 to 120° C. as can be encountered under hot and humid conditions, for example in hot steam sterilization or cleaning with hot steam, are very surprisingly sufficient to react at least some of the primary amine formed in the PUR foam by hydrolytic cleavage of urethane and urea bonds with the compounds (vi). The amino groups are bound to the α,β-unsaturated carbonyl compounds used according to the present invention by addition onto the C=C double bonds with formation of a covalent bond. The diffusion or migration of primary amines out of the polyurethane foams can thus be reduced according to the present invention. This is particularly true when the compounds (vi) are built into the polyurethane network being formed as a result of the presence of groups such as OH or $NH_2$ capable of being incorporated into the polyurethane structure. In this way, not only are the compounds (vi) fixed and their diffusion from the polyurethane foams is thereby prevented, but the primary amine bound to the compound (vi) is likewise immobilized.

Preference is given to compounds (vi) which have the following structural feature:

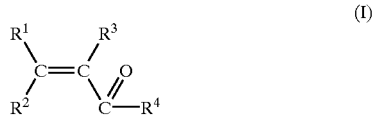

where the radicals $R^1$ to $R^4$ have the following meanings:
$R^1$: H, $C_1$–$C_{12}$-alkyl, $C_6$–$C_{20}$-aryl,
$R^2$: H, $C_1$–$C_{12}$-alkyl, $C_6$–$C_{20}$-aryl,
$R^3$: H, $C_1$–$C_{12}$-alkyl, $C_6$–$C_{20}$-aryl,
$R^4$: H, $C_1$–$C_{12}$-alkyl, $C_6$–$C_{20}$-aryl, —O—$C_1$–$C_{12}$-alkyl, —O—$C_1$–$C_{12}$-alkyl-OH, —$C_1$–$C_{12}$-alkyl-OH, —O—$C_1$–$C_{12}$-alkyl,
—$C_1$–$C_{12}$-alkyl-$NH_2$, —O—$C_1$–$C_{12}$-alkyl-$NH_2$, —O-benzyl, —O-aryl,
—O—$C_1$–$C_{12}$-alkyl-COOH, —O—$C_1$–$C_{12}$-alkyl-CH(OH)—$CH_2$—O—(CO)—$CHCH_2$,
—O—$C_1$–$C_{12}$-alkyl-O—(CO)—$CHCH_2$.

As (vi), particular preference is given to the following compounds: acrylic acid, crotonic acid, isocrotonic acid, sorbic acid, fumaric acid, cinnamic acid, hydroxyethyl acrylate, 3-(acryloyloxy)-2-hydroxypropyl methacrylate, benzyl cinnamate, trans-3-nonen-2-one, benzalacetone, dibenzalacetone, benzalacetophenone, 1-methylbenzalacetophenone, crotonaldehyde, cinnamaldehyde, methyl vinyl ketone and/or α,β-unsaturated polyester diols prepared by polycondensation of maleic acid, fumaric acid and/or acrylic acid with oligomeric diols such as butanediol, diethylene glycol, propylene glycol, 1,3-propanediol and/or triols such as glycerol and having a molecular weight factor per double bond of from 150 to 3000, a functionality of from 2 to 6, a hydroxyl number of from 20 to 800 mg KOH/g and an acid number of from 0 to 15.

In particular, the following compounds are used as (vi): hydroxyethyl acrylate, 3-(acryloyloxy)-2-hydroxypropylmethacrylate, trans-3-nonen-2-one, benzyl cinnamate, crotonic acid and/or α,β-unsaturated polyester diols (A) prepared by polycondensation of maleic acid, fumaric acid or acrylic acid with oligomeric diols such as butanediol, diethylene glycol, propylene glycol, 1,3-propanediol and/or triols such as glycerol and having a molecular weight factor per double bond of from 150 to 3000, a functionality of from 2 to 6, a hydroxyl number of from 20 to 800 mg KOH/g and an acid number of from 0 to 15.

α,β-unsaturated carbonyl compounds having additional functional groups such as OH and $NH_2$ which are built into the PUR network lead to a particularly significant reduction in the MDA and TDA contents. Examples which may be mentioned are hydroxyethyl acrylate and 3-(acryloyloxy)-2-hydroxypropyl methacrylate. Polyols containing integrated C=C double bonds conjugated with the carbonyl group act in a similar way.

In general, particular preference is given to compounds (vi) which dissolve readily in the isocyanates or the compounds which are reactive toward isocyanates. The compounds (vi) are preferably used in admixture with the isocyanates.

In the process of the present invention for producing polyurethane foams, (vi) is preferably used in an amount of from 0.1 to 20% by weight, particularly preferably from 0.5 to 10% by weight, based on the weight of the polyisocyanate polyaddition products.

The polyurethane foams obtainable according to the present invention have the particular advantage that any primary amines, in particular primary aromatic amines, formed by hydrolysis are converted into an unproblematical form by means of the compounds (vi). The polyurethane foams, in particular mattresses, furniture upholstery or foam backing for carpets, thus particularly preferably contain products of the reaction of primary and/or secondary amines, preferably aromatic amines, with the abovementioned compounds (vi), i.e. the α,β-unsaturated carboxylic acids, α,β-unsaturated carboxylic acid derivatives, α,β-unsaturated ketones and/or α,β-unsaturated aldehydes.

The compounds described above, i.e. the hydrophobic compounds and also (i) organic, cyclic compounds having a molecular weight of from 200 to 3000 g/mol, (ii) salts of metals of transition groups I, II and/or VIII, (iii) organic and/or inorganic acid anhydrides, (iv) cyclic sulfonic esters and/or sulfones, (v) lactones, lactams and/or cyclic esters and/or (vi) α,β-unsaturated carboxylic acids, α,β-unsaturated carboxylic acid derivatives, α,β-unsaturated ketones and/or α,β-unsaturated aldehydes, can be used for producing polyisocyanate polyaddition products by generally known methods, for example by reacting isocyanates with compounds which are reactive toward isocyanates in the presence or absence of catalysts, blowing agents, additives and/or auxiliaries. For example, compact or cellular, for example microcellular, flexible, semirigid or rigid polyurethane foams, thermoplastic polyurethanes or polyurethane elastomers can be produced as polyisocyanate polyaddition products by customary methods using the inhibitors employed according to the present invention. The compounds described are preferably used in processes for producing polyurethane elastomers or foamed polyisocyanate polyaddition products, in particular flexible polyurethane foams having a density of from 15 to 300 $kg/m^3$, preferably from 2 to 70 $kg/m^3$, preferably mattresses and/or furniture upholstery or carpet backing, in particular hospital mattresses, by reacting isocyanates with compounds which are reactive toward isocyanates in the presence of catalysts, blowing agents and, if desired, additives and/or auxiliaries. These products, i.e. in particular the furniture upholstery and/or carpet backing or the mattresses, are increasingly treated with hot steam for the purpose of cleaning or disinfection, so that it is precisely these products in which the advantages obtained according to the present invention are particularly pronounced.

The generally customary starting materials for producing the polyisocyanate polyaddition products are described below by way of example.

As isocyanates, it is possible to use the aliphatic, cycloaliphatic, araliphatic and preferably aromatic organic isocyanates known per se, preferably polyfunctional isocyanates, particularly preferably diisocyanates.

Specific examples are: alkylene diisocyanates having from 4 to 12 carbon atoms in the alkylene radical, e.g. dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates such as cyclohexane 1,3- and 1,4-diisocyanate and also any mixtures of these isomers, 1-isocyanato-3,3,5-trimethyl-5-isocyanatomethylcyclohexane (isophorone diisocyanate), hexahydrotolylene 2,4- and 2,6-diisocyanate and also the corresponding isomer mixtures, dicyclohexylmethane 4,4'-, 2,2'- and 2,4'-diisocyanate and also the corresponding isomer mixtures, aromatic diisocyanates and polyisocyanates, e.g. tolylene 2,4- and 2,6-diisocyanate (TDI) and the corresponding isomer mixtures, diphenylmethane 4,4'-, 2,4'- and 2,2'-diisocyanate (MDI) and the corresponding isomer mixtures, naphthalene 1,5-diisocyanate (NDI), mixtures of diphenylmethane 4,4'- and 2,4'-diisocyanates, mixtures of NDI and diphenylmethane 4,4'- and/or 2,4'-diisocyanates, 3,3'-dimethyl-4,4'-diisocyanatobiphenyl (TODI), mixtures of TODI and diphenylmethane 4,4'- and/or 2,4'-diisocyanates, polyphenylpolymethylene polyisocyanates, mixtures of diphenylmethane 4,4'-, 2,4'- and 2,2'-diisocyanates and polyphenylpolymethylene polyisocyanates (crude MDI) and mixtures of crude MDI and tolylene diisocyanates. The organic diisocyanates and polyisocyanates can be used individually or in the form of their mixtures.

Use is frequently also made of modified polyfunctional isocyanates, i.e. products which are obtained by chemical reaction of organic diisocyanates and/or polyisocyanates. Examples which may be mentioned are diisocyanates and/or polyisocyanates containing ester, urea, biuret, allophanate, carbodiimide, isocyanurate, uretdione and/or urethane groups. Specific examples of suitable modified isocyanates are: organic, preferably aromatic polyisocyanates containing urethane groups and having NCO contents of from 33.6 to 15% by weight, preferably from 31 to 21% by weight, based on the total weight, modified diphenylmethane 4,4'-diisocyanate, modified diphenylmethane 4,4'- and 2,4'-diisocyanate mixtures, modified NDI, modified TODI, modified crude MDI and/or tolylene 2,4- or 2,6-diisocyanate, with examples of dialkylene glycols or polyoxyalkylene glycols which can be used individually or as mixtures being: diethylene glycol, dipropylene glycol, polyoxyethylene, polyoxypropylene and polyoxypropylene-polyoxyethylene glycols, triols and/or tetrols. Also suitable are prepolymers containing NCO groups, having NCO contents of from 25 to 3.5% by weight, preferably from 21 to 14% by weight, based on the total weight, and prepared from, for example, polyester polyols and/or preferably polyether polyols and diphenylmethane 4,4'-diisocyanate, mixtures of diphenylmethane 2,4'- and 4,4'-diisocyanate, NDI, TODI, mixtures of NDI and isomers of MDI, tolylene 2,4- and/or 2,6-diisocyanates or crude MDI. Further modified isocyanates which have been found to be useful are liquid polyisocyanates containing carbodiimide groups and/or isocyanurate rings and having NCO contents of from 33.6 to 15% by weight, preferably from 31 to 21% by weight, based on the total weight, e.g. ones based on diphenylmethane 4,4'-, 2,4'- and/or 2,2'-diisocyanate, NDI, TODI and/or tolylene 2,4- and/or 2,6-diisocyanate.

The modified polyisocyanates may, if desired, be mixed with one another or with unmodified organic polyisocyanates such as diphenylmethane 2,4'- and/or 4,4'-diisocyanate, NDI, TODI, crude MDI and tolylene 2,4- and/or 2,6-diisocyanate.

Isocyanates which are preferably used in the mixtures employed according to the present invention or the process of the present invention are diphenylmethane 4,4'-, 2,4'- and/or 2,2'-diisocyanate, tolylene 2,4- and/or 2,6-diisocyanate, NDI, hexamethylene diisocyanate and/or isophorone diisocyanate, with these isocyanates being able to be used in any mixtures or in modified form as described above.

As isocyanate-reactive compounds, if desired in addition to the hydrophobic compounds used according to the present invention, insofar as the latter are reactive toward isocyanates, usually having at least two reactive hydrogen atoms, usually hydroxyl and/or amino groups, use can advantageously be made of those having a functionality of from 2 to 8, preferably from 2 to 6, and a molecular weight of usually from 60 to 10000. Compounds which have been found to be useful are, for example, polyetherpolyamines and/or preferably polyols selected from the group consisting of polyether polyols, polyester polyols, polythioether polyols, polyesteramides, hydroxyl-containing polyacetals and hydroxyl-containing aliphatic polycarbonates or mixtures of at least two of the polyols mentioned. Preference is given to using polyester polyols and/or polyether polyols which can be prepared by known methods.

The polyester polyols preferably have a functionality of from 2 to 4, in particular from 2 to 3, and a molecular weight of usually from 500 to 3000 g/mol, preferably from 1200 to 3000 g/mol and in particular from 1800 to 2500 g/mol.

The polyether polyols have a functionality of preferably from 2 to 6 and usually have molecular weights of from 500 to 8000.

Suitable polyether polyols also include, for example, polymer-modified polyether polyols, preferably graft polyether polyols, in particular those based on styrene and/or acrylonitrile which can be prepared by in situ polymerization of acrylonitrile, styrene or preferably mixtures of styrene and acrylonitrile.

Like the polyester polyols, the polyether polyols can be used individually or in the form of mixtures. They can also be mixed with the graft polyether polyols or polyester polyols or with hydroxyl-containing polyesteramides, polyacetals and/or polycarbonates.

Polyol components used for rigid polyurethane foams which may contain isocyanurate structures are high-functionality polyols, in particular polyether polyols based on high-functionality alcohols, sugar alcohols and/or saccharides as initiator molecules while polyols used for flexible foams are 2- and/or 3-functional polyether polyols and/or polyester polyols based on glycerol and/or trimethylolpropane and/or glycols as initiator molecules or alcohols to be esterified. The polyether polyols are prepared using a known technology. Suitable alkylene oxides for preparing the polyols are, for example, tetrahydrofuran, 1,3-propylene oxide, 1,2- or 2,3-butylene oxide, styrene oxide and preferably ethylene oxide and 1,2-propylene oxide. The alkylene oxides can be used individually, alternately in succession or as mixtures. Preference is given to using alkylene oxides which lead to primary hydroxyl groups in the polyol. Particular preference is given to using polyols which have been alkoxylated using ethylene oxide at the conclusion of the alkoxylation and therefore have primary hydroxyl groups. For producing thermoplastic polyurethanes, preference is given to using polyols having a functionality of from 2 to 2.2 and no crosslinker.

As compounds which are reactive toward isocyanates, it is also possible to use chain extenders and/or crosslinkers. The addition of chain extenders, crosslinkers or, if desired, mixtures thereof can prove to be advantageous for, for example, modifying the mechanical properties, e.g. the hardness, of the polyisocyanate polyaddition products produced using these substances. Chain extenders and/or crosslinkers which can be used are water, diols and/or triols having molecular weights of from 60 to <500, preferably from 60 to 300. Examples of suitable chain extenders/crosslinkers are aliphatic, cycloaliphatic and/or aralphatic diols having from 2 to 14, preferably from 4 to 10, carbon atoms, for example ethylene glycol, 1,3-propanediol, 1,10-decanediol, o-, m-, p-dihydroxycyclohexane, diethylene glycol, dipropylene glycol and preferably 1,4-butanediol, 1,6-hexanediol and bis(2-hydroxyethyl)hydroquinone, triols such as 1,2,4- or 1,3,5-trihydroxycyclohexane, glycerol and trimethylolpropane and low molecular weight hydroxyl-containing polyalkylene oxides based on ethylene oxide and/or 1,2-propylene oxide and diols and/or triols as initiator molecules.

If chain extenders, crosslinkers or mixtures thereof are employed for producing the polyisocyanate polyaddition products, they are advantageously used in an amount of from 0 to 20% by weight, preferably from 2 to 8% by weight, based on the weight of the compounds which are reactive toward isocyanates; thermoplastic polyurethanes are preferably produced without a crosslinker.

Suitable catalysts are generally customary compounds, for example organic amines such as triethylamine, triethylenediamine, tributylamine, dimethylbenzylamine, N,N,N',N'-tetramethylethylenediamine, N,N,N',N'-tetramethylbutanediamine, N,N,N',N'-tetramethylhexane-1,6-diamine, dimethylcyclohexylamine, pentamethyldipropylenetriamine, pentamethyldiethylenetriamine, 3-methyl-6-dimethylamino-3-azapentol, dimethylaminopropylamine, 1,3-bis(dimethylamino)butane, bis(2-dimethylaminoethyl) ether, N-ethylmorpholine, N-methylmorpholine, N-cyclohexylmorpholine, 2-dimethylaminoethoxyethanol, dimethylethanolamine, tetramethylhexamethylenediamine, dimethylamino-N-methylethanolamine, N-methylimidazole, N-(3-aminopropyl)imidazole, N-(3-aminopropyl)-2-methylimidazole, 1-(2-hydroxyethyl) imidazole, N-formyl-N,N'-dimethylbutylenediamine, N-dimethylaminoethylmorpholine, 3,3'-bis (dimethylamino)-di-n-propylamine and/or 2,2'-bis(2-piperazinoisopropyl) ether, dimethylpiperazine, N,N'-bis(3-aminopropyl)ethylenediamine and/or tris (N,N-dimethylaminopropyl)-s-hexahydrotriazine, or mixtures comprising at least two of the amines mentioned. Also possible are relatively high molecular weight tertiary amines as are described, for example, in DE-A 28 12 256. Further catalysts which can be used for this purpose are customary organic metal compounds, preferably organic tin compounds such as tin(II) salts of organic carboxylic acids, e.g. tin(II) acetate, tin(II) octoate, tin(II) ethylhexanoate and tin(II) laurate and the dialkyltin(IV) salts of organic carboxylic acids, e.g. dibutyltin diacetate, dibutyltin dilaurate, dibutyltin maleate and dioctyltin diacetate. Tertiary aliphatic and/or cycloaliphatic amines are preferably present in the mixtures, particularly preferably triethylenediamine.

As blowing agents, it is possible to use, if desired, preferably for producing foamed polyurethanes, generally known blowing agents such as materials which have a boiling point at atmospheric pressure in the range from −40° C. to 120° C., gases and/or solid blowing agents and/or water in customary amounts, for example carbon dioxide, alkanes and/or cycloalkanes, e.g. isobutane, propane, n- or iso-butane, n-pentane and cyclopentane, ethers such as diethyl ether, methyl isobutyl ether and dimethyl ether, nitrogen, oxygen, helium, argon, nitrous oxide, halogenated hydrocarbons and/or partially halogenated hydrocarbons, e.g. trifluoromethane, monochlorotrifluoroethane, difluoroethane, pentafluoroethane or tetrafluoroethane, or mixtures comprising at least two of the blowing agents mentioned by way of example.

Examples of auxiliaries and/or additives are surface-active substances, foam stabilizers, cell regulators, fillers, dyes, pigments, flame retardants, hydrolysis inhibitors, fungistatic and bacteriostatic substances.

The organic polyisocyanates and the isocyanate-reactive compounds having a molecular weight of from 60 to 10000 g/mol are usually reacted in such amounts that the equivalence ratio of NCO groups of the polyisocyanates to the sum of the reactive hydrogen atoms of the isocyanate-reactive compounds is 0.5–5:1, preferably 0.9–3:1 and in particular 0.95–2:1.

It may be advantageous for the polyurethanes to contain at least some bound isocyanurate groups. In these cases, the ratio of NCO groups of the polyisocyanates to the sum of the reactive hydrogen atoms is advantageously 1.5–60:1, preferably 1.5–8:1.

The polyisocyanate polyaddition products can, for example, be produced by the one-shot method or the known prepolymer method, for example with the aid of the high-pressure or low-pressure technique in open or closed molds, reaction extruders or belt units.

The mixtures used according to the present invention are preferably employed for producing foamed polyisocyanate polyaddition products, for example foamed polyurethanes and/or polyisocyanurates.

It has been found to be advantageous to produce the polyisocyanate polyaddition products by the two-component process and to combine the compounds which are reactive toward isocyanates and, if desired, the catalysts, blowing agents and/or auxiliaries and/or additives as the A component and to use the isocyanates and catalysts and/or blowing agents as the B component. The hydrophobic compounds can, if they have no groups which are reactive toward isocyanates, be used in the A and/or B component or in the constituents of these components. Hydrophobic compounds which have groups which are reactive toward isocyanates, for example hydroxyl groups, are preferably used in the polyol component.

The invention is illustrated by the following examples.

EXAMPLES

In order to simulate conditions as can occur in the abovementioned specific applications, aging under hot and humid conditions was carried out on specimens of the flexible foams mentioned below. For this purpose, test cubes having an edge length of 3 cm were aged at 90° C. and 90% relative atmospheric humidity for 72 hours in an air conditioned chamber. Under these conditions, hydrolytic cleavage of urethane and urea bonds and thus the formation of aromatic amines can occur. The amine formed was subsequently extracted by means of a method developed by Prof. Skarping, University of Lund. For this purpose, the foam is squeezed out 10 times with 10 ml of acetic acid (w=1% by weight). The acetic acid was, with the foam specimen compressed, transferred to a 50 ml volumetric flask. The process was repeated three times and the volumetric flask was made up to the mark with acetic acid.

The MDA content of the combined extracts was subsequently determined by means of capillary electrophoresis with UV detection. The MDA and TDA contents reported in the tables correspond to the absolute contents of MDA and TDA formed in the PUR foam.

1) Flexible polyurethane foam, hereinafter referred to as Comparative System 1, produced by mixing 750 g of A component with 354 g of B component (index: 90) and transferring the foaming mixture into an aluminum mold (40×40×10 cm) heated to 53° C., with the components having the following compositions:

A component

| 97 parts by weight | of a polyol having an OHN of 28, a mean functionality of 2.3 and an EO/PO ratio of 14/86, |
|---|---|
| 3 parts by weight | of a polyol having an OHN of 42, a mean functionality of 3 and a PO/EO ratio of 30/70, |
| 3.31 parts by weight | of water, |
| 0.8 part by weight | of aminopropylimidazole, |
| 0.6 part by weight | of Lupragen ® N107, OHN: 421 (BASF Aktiengesellschaft), |
| 0.5 part by weight | of Tegostab ® B 8631 (Goldschmidt) |

B component
Mixture of 50% of a polymeric MDI and 50% of a 1:1 mixture of 2,4'-MDI and 4,4'-MDI.

This system includes aminopropylimidazole and 2-(2-dimethylaminoethoxy)ethanol as catalysts which can be built into the polyurethane structure. It was selected to demonstrate the particular effectiveness of the additives in PUR formulations containing catalysts and catalytically active spacer polyols which can be built into the PUR network.

2) Flexible polyurethane foam (index: 90), hereinafter referred to as Comparative System 2, which was employed as a model for standard flexible foams, produced by mixing 750 g of A component with 354 g of B component (index: 90) and transferring the foaming mixture into an aluminum mold (40×40×10 cm) heated to 53° C., with the components having the following compositions:

A component

| 97 parts by weight | of a polyol having an OHN of 28, a mean functionality of 2.3 and an EO/PO ratio of 14/86, |
|---|---|
| 3 parts by weight | of a polyol having an OHN of 42, a mean functionality of 3 and a PO/EO ratio of 30/70, |
| 3.31 parts by weight | of water, |
| 0.22 part by weight | of 1,4-diazabicyclo[2.2.2]octane, |
| 0.14 part by weight | of Lupragen ® N 206 (BASF Aktiengesellschaft), |
| 0.5 part by weight | of Tegostab ® B 8631 (Goldschmidt) |

B component
Mixture of 50% of a polymeric MDI and 50% of a 1:1 mixture of 2,4'-MDI and 4,4'-MDI.

3) Flexible polyurethane foam (index: 90), hereinafter referred to as Comparative System 3, produced from:

A component

| 100 parts by weight | of a polyol having an OHN of 35, a mean functionality of 3.0 and an EO/PO ratio of 13.3/86.4, |
|---|---|
| 3.31 parts by weight | of water, |
| 0.35 part by weight | of Lupragen ® N 201 (BASF), |
| 0.38 part by weight | of tin dioctoate, |
| 1.0 part by weight | of Tegostab ® B 8680 (Goldschmidt) |

B component:
Mixture of 50% of a polymeric MDI and 50% of a 1:1 mixture of 2,4'-MDI and 4,4'-MDI.

4) Flexible polyurethane foam (index: 90), hereinafter referred to as Comparative System 4, produced by mixing 750 g of A component with 275 g of B component (index: 115) and transferring the foaming mixture to an open mold having a capacity of 40 l, with the components having the following compositions:

A component

| 100 parts by weight | of Lupranol ® 2080 (BASF Aktiengesellschaft), |
|---|---|
| 4.50 parts by weight | of water, |
| 0.30 part by weight | of Dabco ® 33LV (Air Products), |
| 0.20 part by weight | of tin dioctoate, |
| 1.00 part by weight | of silicone stabilizer BF 2370 |

B component
Lupranat® T 80 (BASF Aktiengesellschaft)

5) Flexible polyurethane foam (index: 90), hereinafter referred to as Comparative System 5, produced from:

A component

| 100 parts of | Lupranol ® 2080 (BASF Aktiengesellschaft), |
|---|---|
| 3.80 parts of | water |
| 0.15 part of | Dabco ® 33LV (Air Products), |
| 0.26 part of | tin dioctoate, |
| 0.05 part of | Niax ® A1 (OSI), |
| 1.00 part of | silicone stabilizer BF 2370 |

B component
Lupranat® T 80 (BASF Aktiengesellschaft)

In Table 1, the chemical and physical properties of the hydrophobic compounds used are compared.

TABLE 1

Chemical and physical properties of the hydrophobic compounds

| Hydrophobic compound | OH number [mg KOH/g] | Viscosity [mPas] | Oxirane content [%] |
|---|---|---|---|
| 1 (Kraton liquid polymer L 2203) | 33 | 50000 | 0.00 |
| 2 (Merginat PV 235) | 250–300 | 1200–2000 | 2.59 |
| 3 (Merginat PV 300) | 85 | 2990 | 1.77 |
| 4 (Sovermol 1137/05) | 50–80 | 10000–14000 | 0.00 |
| 5 | 61 | 955 | |
| 6 | 80 | 565 | |

Chemical nature of the hydrophobic compounds:

1: Hydroxy-functionalized polyethylene-polybutylene, Shell

2: Branched oleochemical polyol, HOBUM

3: Branched oleochemical polyol, HOBUM

4: Slightly branched fat-chemical polyester, Henkel

5: Polyester polyol based on ADA/Pripol 1017 (Unichema)/DEG/TMP, where Pripol 1017 (BASF Aktiengesellschaft) is a dimeric fatty acid ester and is present in 5 in an amount of about 10%

6: Polyether polyol based on castor oil/PO, BASF Aktiengesellschaft

ADA: Adipic acid

PO: Propylene oxide

DEG: Diethylene glycol

TMP: trimethylolpropane

TABLE 2

Summary of Examples 1 to 15

| Example | Comparative System | Hydrophobic compound added | Amount of hydrophobic compound [% by weight in A component] |
|---|---|---|---|
| 1 | 1 | — | — |
| 2 | 1 | 2 | 1 |
| 3 | 1 | 2 | 2 |
| 4 | 1 | 2 | 5 |
| 5 | 1 | 2 | 11 |
| 6 | 1 | 4 | 11 |
| 7 | 1 | 3 | 11 |
| 8 | 2 | — | — |
| 9 | 2 | 2 | 11 |
| 10 | 3 | — | — |
| 11 | 3 | 1 | 10 |
| 12 | 4 | — | — |
| 13 | 4 | 5 | 30 |
| 14 | 5 | — | — |
| 15 | 5 | 6 | 100 |

Comparative Systems 1 to 5 were produced with and without addition of the hydrophobic compounds listed in Table 1.

In the Examples summarized in Table 2, the proportion in % by weight indicated in the table of the base polyol of the respective A component described under 1) to 5) was in each case replaced by a hydrophobic compound having at least two groups which are reactive toward isocyanates or a mixture of hydrophobic compounds having at least two groups which are reactive toward isocyanates.

Table 3 compares the MDA or TDA contents of Examples 1 to 15 with and without addition of hydrophobic compounds which in each case have at least two groups which are reactive toward isocyanates.

TABLE 3

Comparison of the MDA contents of flexible PUR foams with and without addition of hydrophobic compounds having at least two groups which are reactive toward isocyanates

| Example | Cream time [s] | Gel time [s] | Rise time [s] | 4,4'-MDA [ppm] w.o.a. | 2,4'-MDA [ppm] w.o.a. | 4,4'-MDA [ppm] w.a. | 2,4'-MDA [ppm] w.a. |
|---|---|---|---|---|---|---|---|
| 1 | 13 | 80 | 100 | <1 | <1 | 397 | 687 |
| 2 | 20 | 75 | 110 | <1 | <1 | 139 | 275 |
| 3 | 20 | 80 | 115 | <1 | <1 | 109 | 225 |
| 4 | 20 | 80 | 115 | <1 | <1 | 90 | 94 |
| 5 | 12 | 75 | 105 | <1 | <1 | 56 | 141 |
| 6 | 15 | 90 | 105 | <1 | <1 | 87 | 200 |
| 7 | 15 | 85 | 135 | <1 | <1 | 96 | 207 |
| 8 | 13 | 45 | 80 | <1 | <1 | 32 | 78 |
| 9 | 13 | 55 | 95 | <1 | <1 | 24 | 66 |
| 10 | 15 | 95 | 130 | <1 | <1 | 53 | 153 |
| 11 | 25 | 150 | 180 | <1 | <1 | 11 | 27 |
| 12 | — | — | — | <1 | <1 | 69 | 35 |
| 13 | — | — | — | <1 | <1 | 24 | 15 |
| 14 | — | — | — | <1 | <1 | 69 | 35 |
| 15 | — | — | — | <1 | <1 | 17 | 9 | w.o.a.: Extraction after processing of the foam
w.a.: Extraction after hot-humid aging for 3 days at 90° C. and 90% relative atmospheric humidity in an air conditioned chamber Table 4 presents examples in which further compounds from the group consisting of (i), (ii), (iii), (iv), (v) and (vi) which are capable of further reducing the primary amine content were added in addition to the hydrophobic compounds to the polyurethane foam formulations. Table 5 shows the corresponding results.

TABLE 4

Foams produced by addition of 2 parts of the hydrophobic compound 2 and a further compound from the group consisting of (i), (ii), (iii), (iv), (v) and (vi) for reducing the primary amine content

| Example | Comparative System | Additive added | Amount of additive [% by weight dissolved in A component] |
|---|---|---|---|
| 16 | 1 | Lupragen VP 9198 | 10 |
| 17 | 1 | 1-naphthol-8-sulfonic sultone | 2 |

Lupragen® VP 9198 (BASF Aktiengesellschaft): $\alpha,\beta$-unsaturated polyester diol having an OH number of 336 mg KOH/g, an acid number of 0.7 and a molecular weight factor per double bond of 262, prepared by polycondensation of maleic anhydride, 1,3-propanediol and diethylene glycol in a molar ratio of 1:1:1.

TABLE 5

Results of Examples 16 and 17

| Example | Cream time [s] | Gel time [s] | Rise time [s] | 4,4'-MDA [ppm] w.o.a. | 2,4'-MDA [ppm] w.o.a. | 4,4'-MDA [ppm] w.a. | 2,4'-MDA [ppm] w.a. |
|---|---|---|---|---|---|---|---|
| 16 | 21 | 117 | 150 | <1 | <1 | 33 | 82 |
| 17 | 14 | 83 | — | <1 | <1 | 33 | 89 | w.o.a.: Extraction after processing of the foam
w.a.: Extraction after hot-humid aging for 3 days at 90° C. and 90% relative atmospheric humidity in an air conditioned chamber The detection limit of the capillary electrophoretic determination is 1 ppm.

As the MDA and TDA contents in Examples 1 to 12 show, the advantages obtained according to the present invention, i.e. the significantly reduced content of primary aromatic amines after aging under hot and humid conditions due to the addition of hydrophobic compounds, were able to be demonstrated convincingly. The reduced content of aromatic amines is based on their formation being prevented by the addition of the hydrophobic compounds reducing the penetration of moisture into the interior of the foam and thus countering hydrolytic cleavage of urethane and urea bonds.

We claim:

1. A polyisocyanate polyaddition product comprising hydrophobic compounds plus at least one further compound and/or derivative thereof reactive toward primary amines, said at least one further compound comprising organic and/or inorganic acid anhydrides, wherein said hydrophobic compounds are selected from the group of reaction products of castor oil with alkylene oxides, epoxidized fatty acid esters, low molecular weight hydroxy-functional polyolefins and oleochemical polyols based on a $C_9$–$C_{22}$-fatty acid and prepared by ring opening of epoxidized triglycerides.

2. A flexible polyurethane foam comprising the polyaddition product of claim 1.

3. A mattress or furniture upholstery and/or carpet backing comprising a flexible polyurethane foam as claimed in claim 2.

4. A method of reducing the primary amine content of polyisocyanate polyaddition products comprising the step of providing in said polyaddition product a hydrophobic compound and at least one further compound and/or derivative thereof, reactive toward primary amines, said at least one further compound comprising and/or inorganic acid anhydrides, wherein said hydrophobic compounds are selected from the group of reaction products of castor oil with alkylene oxides, epoxidized fatty acid esters, low molecular weight hydroxy-functional polyolefins and oleochemical polyols based on a $C_9$–$C_{22}$-fatty acid and prepared by ring opening of epoxidized triglycerides.

5. The polyisocyanate polyaddition product of claim 1 wherein the at least one further compound and/or derivative thereof is reactive toward and/or complexes with tertiary amines.

6. A polyisocyanate polyaddition product comprising a hydrophobic flexible polyurethane foam which comprises hydrophobic compounds plus at least one further compound and/or derivative thereof reactive toward primary amines, said at least one further compound comprising organic and/or inorganic acid anhydrides, wherein said hydrophobic compounds are selected from the group of reaction products of castor oil with alkylene oxides, epoxidized fatty acid esters, low molecular weight hydroxy-functional polyolefins and oleochemical polyols based on a $C_9$–$C_{22}$-fatty acid and prepared by ring opening of epoxidized triglycerides, and wherein the at least one further compound and/or derivative thereof is reactive toward and/or complexes with tertiary amines.

7. The polyisocyanate polyaddition product of claim 6 wherein said hydrophobic compounds each have at least two isocyanate reactive groups.

8. A process for making a foamed polyisocyanate polyaddition product comprising reacting:
   a) compounds which are reactive toward isocyanates, and
   b) isocyanates, in the presence of
   c) hydrophobic compounds selected from the group of reaction products of castor oil with alkylene oxides, epoxidized fatty acid esters, low molecular weight hydroxy-functional polyolefins and oleochemical polyols based on a $C_9$–$C_{22}$-fatty acid and prepared by ring opening of epoxidized triglycerides.
   d) at least one further compound, reactive toward primary amines or capable of forming a derivative reactive toward primary amines, comprising organic and/or inorganic acid anhydrides, and
   e) catalysts, blowing agents, and optionally, auxiliaries and/or additives, to form a hydrophobic polyisocyanate polyaddition product wherein said at least one further compound and/or derivative thereof is present in the product and is reactive toward primary amines.

9. The polyisocyanate polyaddition product of claim 8 wherein said anhydrides comprise carboxylic anhydrides.

10. A polyisocyanate polyaddition product as claimed in claim 1, wherein said low molecular weight hydroxy-function polyolefins have a molecular weight of from 500 to 8000 g/mol.

11. A method as claimed in claim 4, wherein said low molecular weight hydroxy-functional polyolefins have a molecular weight of from 500 to 8000 g/mol.

12. A polyisocyanate polyaddition product as claimed in claim 6, wherein said low molecular weight hydroxy-functional polyolefins have a molecular weight of from 500 to 8000 g/mol.

13. A process as claimed in claim 8, wherein said low molecular weight hydroxy-functional polyolefins have a molecular weight of from 500 to 8000 g/mol.

* * * * *